Figure 1:
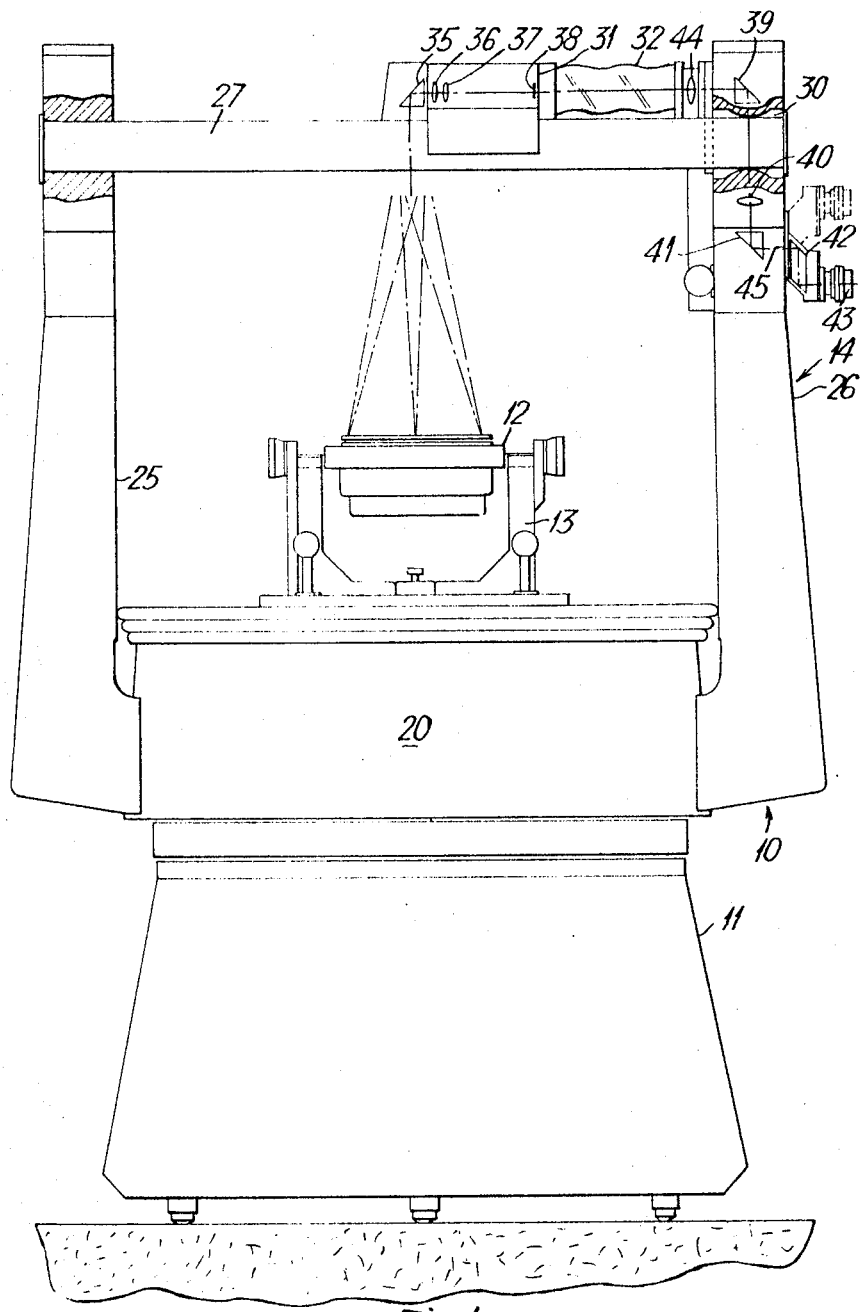

United States Patent

[11] 3,597,089

| [72] | Inventors | David Scarth Ritchie;<br>Stanley James Law, both of Glasgow, Scotland |
|---|---|---|
| [21] | Appl. No. | 823,571 |
| [22] | Filed | May 12, 1969 |
| [45] | Patented | Aug. 3, 1971 |
| [73] | Assignee | Barr & Stroud Limited |
| [32] | Priority | June 13, 1968 |
| [33] | | Great Britain |
| [31] | | 28,109/68 |

[54] TEST TABLE FOR A MAGNETIC COMPASS
7 Claims, 2 Drawing Figs.

[52] U.S. Cl. ................................. 356/139, 33/222, 356/150, 356/171, 73/1 E
[51] Int. Cl. ................................. G01c 17/38
[50] Field of Search ................................. 33/222; 356/139, 142, 143, 150, 170, 171, 248; 350/112, 113

[56] References Cited
UNITED STATES PATENTS

| 670,242 | 1901 | Negus | 356/142 |
|---|---|---|---|
| 994,569 | 1911 | Calhoun | 356/143 |
| 1,203,151 | 1916 | Sperry | 356/142 |
| 1,542,397 | 1925 | Konig | 356/139 |
| 1,966,850 | 1934 | Colt | 356/143 |
| 2,433,452 | 1947 | Harper | 356/150 |
| 2,909,845 | 10/1959 | Mikesell | 350/112 |
| 2,970,510 | 2/1961 | Mixner | 356/142 |

FOREIGN PATENTS

| 24,814 | 1910 | Great Britain | 356/142 |
|---|---|---|---|
| 147,480 | 1921 | Great Britain | 356/142 |

*Primary Examiner* — Ronald L. Wibert
*Assistant Examiner* — J. Rothenberg
*Attorney* — Mason, Fenwick and Lawrence

ABSTRACT: The invention provides a test table for magnetic compasses. Reading errors which occur during a large number of readings necessary in testing accurately a magnetic compass are mitigated by using an optical system which automatically compensates for misalignment of the system with respect to the compass card by mounting the optical system on a head which is temperature compensating to maintain the optical system in fixed relation to the compass test table.

Inventors
DAVID SCARTH RITCHIE &
STANLEY JAMES LAW
By Mason, Fenwick & Lawrence
Attorneys

TEST TABLE FOR A MAGNETIC COMPASS

This invention is concerned with an improved calibration or test table for a magnetic compass.

When calibrating a magnetic compass it is necessary to take a number of accurate readings of diametrically disposed markings on the cord thereof at various headings. It is therefore desirable to have a test table on which accurate readings are possible and which mitigates reading errors.

The present invention is a test table for calibrating a magnetic compass, including a support adapted for receiving a component to be tested, a crossmember mounted to be rotatable about a vertical axis above the compass position, an optical projection system mounted on the crossmember to give an overhead view of the compass and arranged for superimposing an image of a compass card and lubber line in the compass on that of a reference graticule contained in the optical projection system, and an optical viewing system including an eyepiece system, for transmitting the combined image of the compass card and the superimposed graticule to the eyepiece system.

The eyepiece system may include a rhomboid prism and an eyepiece, the eyepiece system being rotatable about the optical axis at the entry to the prism.

Preferable the cross member is mounted on bridging members, extending between columns which are mounted to rotate about the compass position.

The bridging members may be secured to one column and may be mounted in bearings to be able to slide through the other column.

Figure 2:
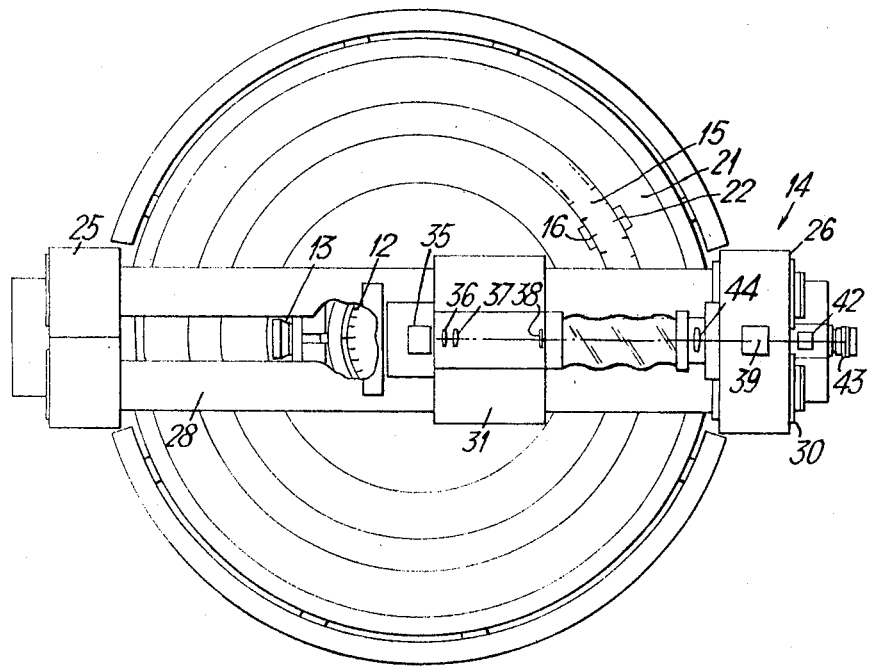

An embodiment of the present invention will no be described, by way of example, with reference to the accompanying drawing, in which:

FIG. 1 is an elevational view of a magnetic test table according to the present invention, parts of the table being broken away to show internal detail; and FIG. 2 is a plan view corresponding to FIG. 1 and again with parts broken way to shown internal detail.

Referring now to the drawing, a magnetic compass test table 10 consists of a base 11 and supports 13 for receiving and supporting a standard size magnetic compass bowl 12 the compass card of which has to be calibrated, a bridge structure 14 secured to a collar 20 which is rotatably mounted on the base 11; and optical projecting and viewing systems incorporated in the bridge structure 14.

The compass bowl 12 and supports 13, as shown in the drawing, are rotatably mounted about a vertical axis on the top surface of the base 11, an azimuth scale 15 shown in FIG. 2 is fixed to the base 11 and cooperates with an index marker 16 which is rotatable with the compass bowl 12 and supports 13.

The bridge structure 14 carries an annular member 21 on which is provided an index marker 22 also cooperating with the scale 15. Vertical columns 25 and 26 are secured to the collar 20 at diametrically opposite points and support two parallel bridging members 27 and 28 extending horizontally over the compass bowl. The members 27 and 28 are rigidly secured to the column 25 but are supported in bearings 30 in the column 26 through which they may slide. A hollow cross member 31 shown in FIG. 2 is mounted on the members 27 and 28 near the middle thereof and is connected to the head of the column 26 by a light-tight bellows tube 32.

The optical projection system is mounted in the crossmember 31 and consists of a prism 35, lenses 36, and 37, and a graitcule 38 at the focal plane of the lenses 36 and 37. The viewing system is mounted in the column 26 and consists of a lens 44, prism 39, lens 40 prism 41 and an eyepiece system comprising a rhomboid prism 42 and eyepiece 43. The center of the reflecting surface of the prism 35 is vertically above the center of the mounting for the compass 12 and the image of diametrical points on the compass card and the lubber line in the compass are transmitted simultaneously from the prism 35, through the other components of the optical system and through the bellows tube 32 to the eyepiece 43. The eyepiece 43 and the prism 42 are rotatable together about a horizontal axis 45 passing through the centers of the first reflecting face of the prism 42 and the prism 41, i.e. the optical axis at the entry to the prism 42.

The metal components of the compass head are, of course, made of a material of low magnetic permeability to minimize external magnetic interference with the compass.

In use, an observer may adjust the eyepiece 43 to the level of his eye by swiveling the eyepiece 43 and prism 42 about the axis 45, this movement having no effect on the image reaching the observer because the prism 42 is rhomboid. The image reaching the observer is that of the diametrically disposed points on the compass card and the lubber line superimposed on the reference graticule 38 and it should be noted that as the observer in effect views the compass card from a point directly above, the readings may be taken without considerations of parallax. Also, as indicated above, the image is not affected by adjustment of the eyepiece 43, so that differently-placed observers see an identical image. Moreover, as the bridging members 27 and 28 are slidingly supported in the column 26, the structure is temperature compensating in that the position of the prism 35 is fixed relative to the center of the mounting for the compass 12. In this way, all the necessary readings may be accurately taken by any observer.

What is claimed is:

1. A test table for calibrating a magnetic crossmember a support to receive a compass to be tested, a cross member mounted above the support and rotatable about a vertical axis, passing therethrough an optical projection system, including a reference graticule, mounted on the crossmember to provide an overhead view of a compass mounted on said support and arranged for superimposing an image of diametrically disposed points on the compass card and the lubber line in the compass on an image of said reference graticule and an optical viewing system including an optical transmitting system and an eyepiece system, said optical transmitting system transmitting the superimposed images from the optical projection system to the eyepiece system.

2. A test table a claimed in claim 1, in which the eyepiece system includes a rhomboid prism and an eyepiece, the eyepiece system being rotatable about the optical axis at the entry to the prism.

3. A test table as claimed in claim 1, in which the crossmember is fixedly mounted on bridging members extending between two substantially vertical columns, the bridging members being fixedly secured at one end to one of said columns and being slidingly supported at the other end in bearings mounted in the other of said columns, said optical viewing system being mounted on said other column.

4. A test table as claimed in claim 1, in which the support is rotatably mounted about said vertical axis.

5. A test table as claimed in claim 3, in which the support is rotatably mounted about said vertical axis.

6. A test table according to claim 1, wherein the input optical element of the optical projection system lies on said vertical axis.

7. A test table for calibrating a magnetic compass by checking for misalignment of the compass card and lubber line, and by detecting eccentricity in the mounting of the compass card, said table including a base structure having a generally horizontal surface on which an azimuth scale is marked, said scale being centered on a vertical axis, a support mounted on said surface to receive a compass to be tested, the support being mounted for rotation about said vertical axis, and carrying an index marker which cooperates with said scale, a superstructure mounted on the base structure for rotation about the vertical axis independently of rotation of said support, and carrying an index marker which cooperates with said scale, said superstructure comprising two substantially vertical columns diametrically disposed with respect to said vertical axis, bridging members extending between said columns and above said support, said bridging members being fixedly secured at one end to one of said columns and being slidingly supported at the other end by bearings mounted in the other of said columns, and a crossmember fixedly secured to said bridging members, said crossmember rigidly supporting an optical projection system arranged to provide an overhead view of points diametrically disposed with respect to said axis on a compass when a compass is mounted on said support, a reference graticule being provided in said projection system, and an optical viewing system mounted on said other column including optical transmitting means for transmitting the image formed by the projection system to an eyepiece system forming part of the viewing system.